(12) United States Patent
Curtis

(10) Patent No.: US 8,001,545 B2
(45) Date of Patent: *Aug. 16, 2011

(54) METHOD AND SYSTEM FOR REGULATING COMMUNICATION TRAFFIC USING A LIMITER THREAD

(75) Inventor: Bryce Allen Curtis, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 920 days.

This patent is subject to a terminal disclaimer.

(21) Appl. No.: 11/862,386

(22) Filed: Sep. 27, 2007

(65) Prior Publication Data

US 2008/0022289 A1    Jan. 24, 2008

Related U.S. Application Data

(62) Division of application No. 09/951,951, filed on Sep. 13, 2001, now Pat. No. 7,299,470.

(51) Int. Cl.
G06F 9/46 (2006.01)
G06F 13/00 (2006.01)
G06F 15/16 (2006.01)
G01R 21/08 (2006.01)

(52) U.S. Cl. ........ 718/100; 719/312; 709/233; 370/229; 370/230; 370/230.1; 370/231; 370/232; 370/233; 370/234; 370/235

(58) Field of Classification Search ........................ None
See application file for complete search history.

(56) References Cited

U.S. PATENT DOCUMENTS

| | | | |
|---|---|---|---|
| 4,930,122 A | 5/1990 | Takahashi et al. | |
| 5,649,103 A | 7/1997 | Datta et al. | |
| 5,815,727 A | 9/1998 | Motomura | |
| 5,907,675 A | 5/1999 | Aahlad | |
| 5,951,653 A | 9/1999 | Hill et al. | |
| 5,991,286 A | 11/1999 | Labonte et al. | |
| 5,999,538 A | 12/1999 | Haddock et al. | |
| 6,055,578 A | 4/2000 | Williams et al. | |
| 6,078,591 A | 6/2000 | Kalkunte et al. | |
| 6,088,363 A | 7/2000 | Shiobara | |
| 6,128,644 A | 10/2000 | Nozaki | |
| 6,154,769 A | 11/2000 | Cherkasova et al. | |
| 6,178,177 B1 | 1/2001 | Vautey | |
| 6,381,649 B1 | 4/2002 | Carlson | |
| 6,434,651 B1 | 8/2002 | Gentry, Jr. | |
| 6,631,462 B1 | 10/2003 | Wolrich et al. | |

FOREIGN PATENT DOCUMENTS

JP    10224356    8/1998

*Primary Examiner* — H. Sough
*Assistant Examiner* — Phuong N Hoang
(74) *Attorney, Agent, or Firm* — Yee & Associates, P.C.; Jeffrey S. LaBaw

(57) ABSTRACT

A methodology for using multiple execution threads to regulate message traffic is presented. An application thread spawns a limiter thread, and each have access in shared memory to a message count that reflects a number of messages that are transmitted by the application thread within a regulated time period. The limiter thread cycles by entering a sleep state for the regulated time period, resetting the message count upon awakening, and then reentering a sleep state. The application thread executes a loop that compares the message count against a maximum number of messages for the regulated time period; if the comparison is favorable, then another message is transmitted and the message count is adjusted. If the comparison is not favorable, then the application thread enters a sleep state; after awakening, it repeats the comparison, and depending on the result, it transmits a message or reenters a sleep state.

5 Claims, 5 Drawing Sheets

```
            public class Limiter implements Runnable {   ~ 402

404 ~ Thread      limiterThread = null;
406 ~ int         maxMessagesPerTimeUnit = 100;

// Static declaration of message counter ensures that this variable
            //     is shared among parent thread and child threads.
408 ~ static    int    messageCounter = 0;

410 ~ public void setMaxMessagesPerTimeUnit( int i ) {
            maxMessagesPerTimeUnit = i;
        }

412 ~ public void start( ) {
            limiterThread = new Thread( this );
            limiterThread.start( );
        }

414 ~ public void stop( ) {
            limiterThread.stop( );
        }

416 ~ public void counterDelayer( ) {

418 ~ messageCounter++;
   420 ~ while ( messageCounter > maxMessagesperTimeUnit ) {
       422 ~ try {Thread.sleep(1);}
              catch (InterruptedException e) {}
          }
       }

424 ~ public void run( ) {
    426 ~ while (true) {
       428 ~ try {Thread.sleep(1000);}
              catch (InterruptedException e) {}
       430 ~ messageCounter = 0;
           }
        }

```
502 ~ Limiter limiter = new Limiter( );
504 ~ limiter.start( );
506 ~ limiter.setMaxMessagesPerTimeUnit( 500 );
      .
      .
      .
508 ~ while ( !done ) {
          try {

// Wait to transmit message if necessary
510 ~         limiter.counterDelayer( );

512 ~         // Generate and transmit message
              .
              .
              .
514 ~     } catch (Exception e) { ... }
      }
      .
      .
      .
516 ~ limiter.stop( );
      .
      .
      .
```

*FIG. 5*

METHOD AND SYSTEM FOR REGULATING COMMUNICATION TRAFFIC USING A LIMITER THREAD

This application is a divisional of application Ser. No. 09/951,951, filed Sep. 13, 2001, status allowed, which is herein incorporated by reference.

This application is a divisional of U.S. application Ser. No. 09/951,951 now U.S. Pat. No. 7,299,470, filed Sep. 13, 2001, which is herein incorporated by reference.

BACKGROUND OF THE INVENTION

1. Field of the Invention

The present invention relates to an improved data processing system and, in particular, to a method and apparatus for input/output processing. Still more particularly, the present invention provides a method and apparatus for implementing a mechanism for transferred data counting.

2. Description of Related Art

In many computing environments, a client-server arrangement enables clients and servers to have specialized duties. By limiting the variety of computational tasks with which a client or a server is burdened, the client or the server can focus its resources on performing its tasks more efficiently. In particular, servers are usually configured to process large numbers of client transactions or to manage storage on behalf of many clients within a network. Although efficient computational management increases the maximum possible load on a server, its computational resources are not limitless, and typically the load on the server is limited in some manner.

For a variety of reasons, it is often desirable to be able to control the amount of traffic that is initiated by a client application to a server. For example, in order to determine the load performance of a Web server, the Web server may be tested by bombarding it with a large number of Web-based requests over a period of time. The requests can originate from a predetermined number of client processes that simulate the data traffic that the Web server would experience from a large number of Web browser applications. In this scenario, it is important to be able to accurately control the rate of requests that are sent to the Web server, thereby controlling the load that is experienced by the Web server, in order to obtain numerically accurate and meaningful measurements that can be used to predict Web server load characteristics under varying, real-life conditions.

As another example, a communication service provider may sell communication services on a subscription basis in which different charges apply to different subscription service levels. Each subscription service level may limit the number of requests from a subscriber's data device to the communication service provider's server below a certain number of requests per time unit, e.g., one hundred requests per second or one thousand requests per minute, even though the available bandwidth may be much greater. In order to provide accurate service, the communication service provider needs to be able to accurately limit the rate of requests that are transmitted by a subscriber.

Therefore, it would be advantageous to have a methodology for accurately limiting the rate of requests that are transmitted from a client to a server.

SUMMARY OF THE INVENTION

A method, a system, an apparatus, and a computer program product are presented for using multiple execution threads in a data processing system to regulate an amount of communication traffic that is generated by an application. An application thread generates data packets or messages to be transmitted, such as client requests to a server. The application thread spawns a limiter thread, and the application thread and the limiter thread have access to a message count variable in shared memory. The message count variable reflects a number of messages that are transmitted by the application thread within a specific time period, e.g., one second; the message count variable can be initially set to zero and subsequently incremented to show the number of messages that have been sent within the specific time period, or the message count variable can be set to a non-zero number and subsequently decremented to show the number of messages that remain to be sent within the specific time period.

After the limiter thread has been spawned, it executes independent of the application thread except for the coordination between the threads through the message count variable. The limiter thread executes in a permanent loop in which it enters a sleep state for a previously specified time period, resets the message count variable upon awakening, and then reenters a sleep state. The limiter thread preferably sleeps for a time period that is equal to a regulated time period; for example, if one hundred messages may be sent in seven seconds, then the limiter thread would sleep for seven seconds. The limiter thread executes until it is killed by the application thread after the application thread has completed a phase in which it is attempting to transmit messages in a regulated fashion.

While the limiter thread is cycling, the application thread is also executing a loop in which it is attempting to transmit messages. The application thread adjusts the message count variable for each message that is transmitted.

However, before a message is transmitted, the application thread checks whether it is allowed to transmit another message by comparing the message count variable with a predetermined value that represents the maximum number of messages that may be sent within the predetermined regulated time period. If the comparison is favorable for transmitting another message, then the application thread transmits another message.

If the comparison is not favorable for transmitting another message, then the application thread waits to transmit another message by entering a sleep state. The application thread preferably sleeps for a time period that is substantially shorter than the regulated time period. When the application thread awakens, it repeats the comparison of the message count variable and the maximum value. Depending on the result of the comparison, the application thread again performs the appropriate action.

BRIEF DESCRIPTION OF THE DRAWINGS

The novel features believed characteristic of the invention are set forth in the appended claims. The invention itself, further objectives, and advantages thereof, will be best understood by reference to the following detailed description when read in conjunction with the accompanying drawings, wherein:

FIG. 4 is a set of Java language statements that depict an example of a Limiter class that may be used to implement a limiter mechanism in accordance with an embodiment of the present invention; and FIG. 5 depicts a set of Java language statements that show the use of a limiter mechanism in accordance with an embodiment of the present invention.

DETAILED DESCRIPTION OF THE INVENTION

The present invention is directed to a system and a methodology for controlling the rate of communication traffic from an application to another application or system. As background, a typical organization of hardware and software components within a distributed data processing system is described prior to describing the present invention in more detail.

Figure 1A:
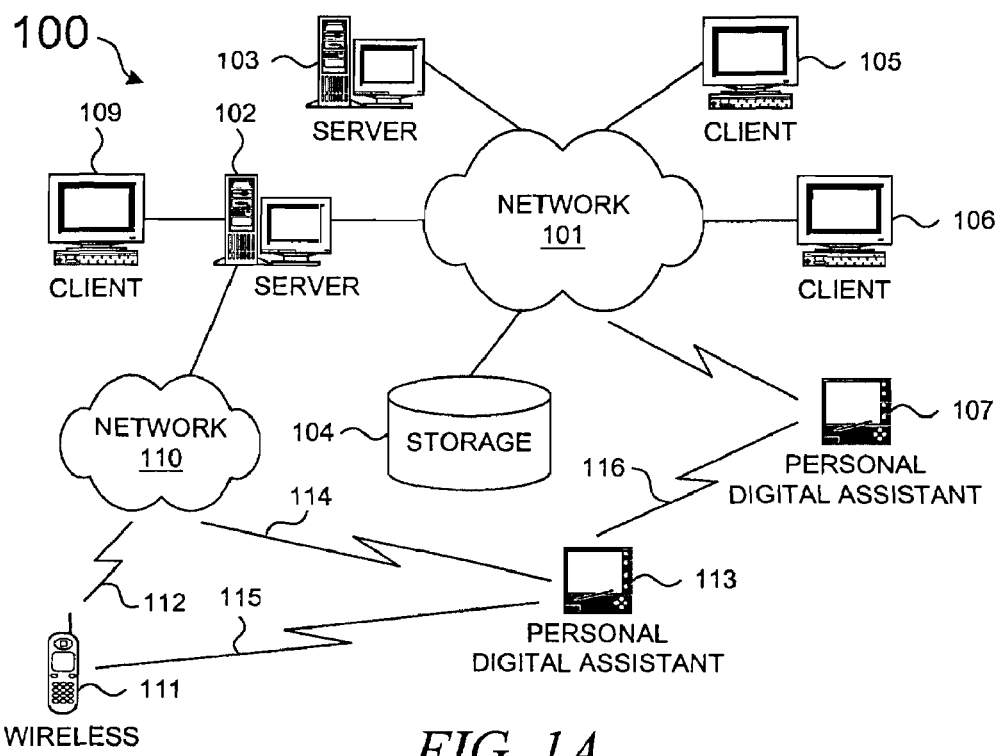
FIG. 1A is a block diagram that depicts a typical distributed data processing system in which the present invention may be implemented.

With reference now to the figures, FIG. 1A depicts a typical network of data processing systems, each of which may contain and/or operate the present invention. Distributed data processing system 100 contains network 101, which is a medium that may be used to provide communications links between various devices and computers connected together within distributed data processing system 100. Network 101 may include permanent connections, such as wire or fiber optic cables, or temporary connections made through telephone or wireless communications. In the depicted example, server 102 and server 103 are connected to network 101 along with storage unit 104. In addition, clients 105-107 also are connected to network 101. Clients 105-107 and servers 102-103 may be represented by a variety of computing devices, such as mainframes, personal computers, personal digital assistants (PDAs), etc. Distributed data processing system 100 may include additional servers, clients, routers, other devices, and peer-to-peer architectures that are not shown.

In the depicted example, distributed data processing system 100 may include the Internet with network 101 representing a worldwide collection of networks and gateways that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. Of course, distributed data processing system 100 may also include a number of different types of networks, such as, for example, an intranet, a local area network (LAN), or a wide area network (WAN). For example, server 102 directly supports client 109 and network 110, which incorporates wireless communication links.
Network-enabled phone 111 connects to network 110 through wireless link 112, and PDA 113 connects to network 110 through wireless link 114. Phone 111 and PDA 113 can also directly transfer data between themselves across wireless link 115 using an appropriate technology, such as Bluetooth™ wireless technology, to create so-called personal area networks (PAN) or personal ad-hoc networks. In a similar manner, PDA 113 can transfer data to PDA 107 via wireless communication link 116.

The present invention could be implemented on a variety of hardware platforms; FIG. 1A is intended as an example of a heterogeneous computing environment and not as an architectural limitation for the present invention.

Figure 1B:
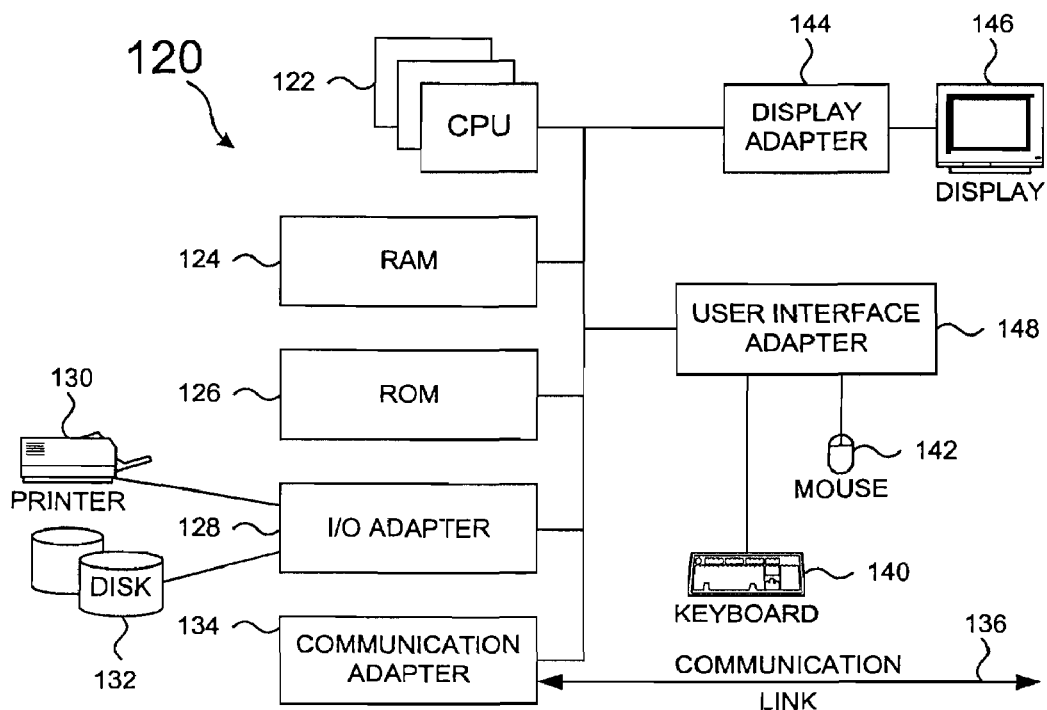
FIG. 1B is a block diagram that depicts a typical computer architecture that may be used within a data processing system in which the present invention may be implemented.

With reference now to FIG. 1B, a diagram depicts a typical computer architecture of a data processing system, such as those shown in FIG. 1A, in which the present invention may be implemented. Data processing system 120 contains one or more central processing units (CPUs) 122 connected to internal system bus 123, which interconnects random access memory (RAM) 124, read-only memory 126, and input/output adapter 128, which supports various I/O devices, such as printer 130, disk units 132, or other devices not shown, such as a audio output system, etc. System bus 123 also connects communication adapter 134 that provides access to communication link 136. User interface adapter 148 connects various user devices, such as keyboard 140 and mouse 142, or other devices not shown, such as a touch screen, stylus, microphone, etc. Display adapter 144 connects system bus 123 to display device 146.

Those of ordinary skill in the art will appreciate that the hardware in FIG. 1B may vary depending on the system implementation. For example, the system may have one or more processors, including a digital signal processor (DSP) and other types of special purpose processors, and one or more types of volatile and non-volatile memory. Other peripheral devices may be used in addition to or in place of the hardware depicted in FIG. 1B. The depicted examples are not meant to imply architectural limitations with respect to the present invention.

In addition to being able to be implemented on a variety of hardware platforms, the present invention may be implemented in a variety of software environments. A typical operating system may be used to control program execution within each data processing system. For example, one device may run a Unix® operating system, while another device may contain a simple Java® runtime environment. A representative computer platform may include a browser, which is a well known software application for accessing hypertext documents in a variety of formats, such as graphic files, word processing files, Extensible Markup Language (XML), Hypertext Markup Language (HTML), Handheld Device Markup Language (HDML), Wireless Markup Language (WML), and various other formats and types of files.

The present invention may be implemented on a variety of hardware and software platforms, as described above. More specifically, though, the present invention is directed to a system and a methodology for controlling the rate of communication traffic that is transmitted by an application, as described in more detail below. In the following examples, an application is shown that generates a series or sequence of messages for one or more different purposes. The application can be understood to be a general-purpose application, but it should also be understood that the application may be constructed specifically for communication tasks. For example, the application could be specifically configured for simulating the transmission of requests from a Web browser application that is operating on a client device to a server that responds to the requests, in which case the limiter mechanism of the present invention could be employed in conjunction with the application to precisely control the rate of requests from the application. In another example, the application may be a Web browser application, and the limiter mechanism of the present invention may be employed in conjunction with the Web browser application as required by a communication service provider to control the rate of requests from the Web browser application in accordance with a subscribed level of service provided by the communication service provider to the Web browser's user.

Messages from the application may be formatted in a proprietary manner or in accordance with well-known standards, e.g., HTTP Request messages. More generally, a message may be a simple data packet or a coordinated set of data packets that are transmitted by the application.

The described application that uses the present invention operates in a computational environment that supports multiple threads of execution, multiple processes, or multiple tasks. For simplicity of discussion, the following examples are directed to a discussion of multiple threads, but it should be understood that the present invention may also be implemented in an operational environment with process management or task management. The application may comprise an application thread that generates message traffic, and the limiter mechanism of the present invention operates in conjunction with the application thread. Moreover, the present application may be implemented in an environment in which an operating system and/or a central processing unit (CPU) allow multiple simultaneous execution paths without regard to thread or process management.

Alternatively, the application may comprise multiple threads of execution, a plurality of which generate message traffic, and multiple instances of the limited mechanism of the present invention could be implemented in conjunction with multiple application threads of execution. For simplicity of presentation, the following examples depict only a single application thread.

Figure 2:
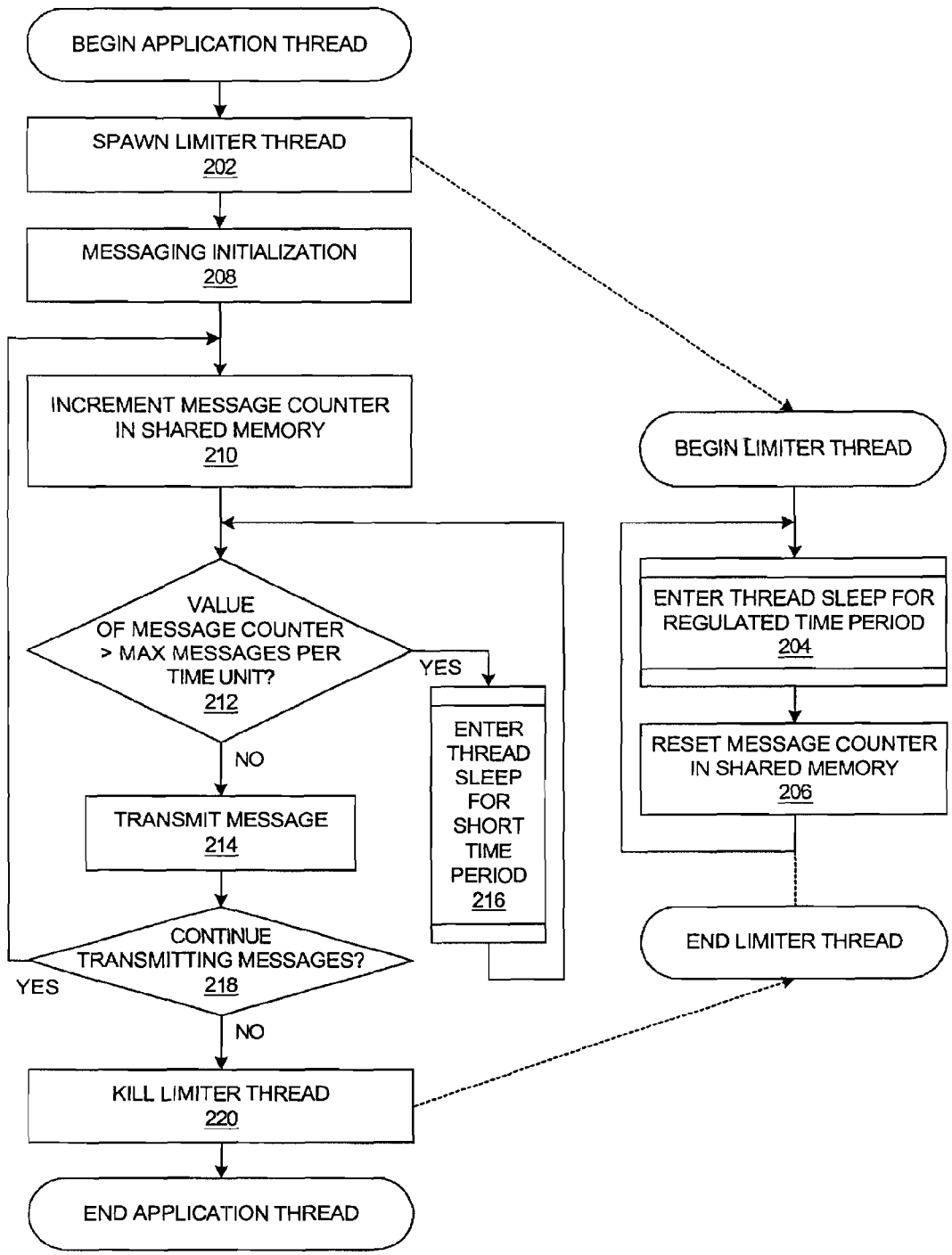
FIG. 2 is a flowchart that depicts a methodology for implementing a communication traffic limiter that regulates the rate of transmission of messages from an application in accordance with the present invention.

With reference now to FIG. 2, a flowchart depicts a methodology for implementing a communication traffic limiter that regulates the rate of transmission of messages from an application in accordance with the present invention. The flowchart shown in FIG. 2 differs from typical flowcharts in that two simultaneous processes are potentially executing during a given time period. The operations that are shown in FIG. 2 center on an application thread that generates data packets or messages to be transmitted, such as client requests to a server. As shown in FIG. 2, it is possible that the application thread has already been executing for some period of time, including a period of time in which the application thread has already transmitting some number of messages in a regulated fashion.

The application thread spawns a limiter thread (step 202), after which the application thread and the limiter thread have access to a message count variable in shared memory. The message count variable reflects a number of messages that have been transmitted by the application thread within a specific time period, e.g., one second. Alternatively, the message count variable reflects a number of messages that remain to be transmitted by the application thread within a specific time period. In other words, the message count variable can be initially set to zero and subsequently incremented to show the number of messages that have been sent within the specific time period, or the message count variable can be set to a maximum, non-zero number and subsequently decremented to show the number of messages that remain to be sent within the specific time period. In the following examples, it is assumed that the message count variable is incremented and then compared to a maximum value.

The limiter mechanism of the present invention limits an application's message traffic based on its rate of transmission, i.e. number of messages per unit of time. The specific time value that is used as the regulated period may be statically or dynamically determined or adjusted based on configuration parameters, operating conditions, user input, or other considerations. For simplicity of presentation, the following examples assume that the regulated time period is one second.

The maximum number of messages that may be transmitted per time unit may be statically or dynamically determined or adjusted based on configuration parameters, operating conditions, user input, or other considerations. For simplicity of presentation, the following examples assume that the maximum number of messages per time unit has been previously determined and is static during the time period of interest.

After the limiter thread has been spawned, it executes independent of the application thread except for the coordination between the threads through the message count variable. The limiter thread executes in a permanent loop in which it enters a sleep state for a previously specified time period (step 204), resets the message count variable upon awakening (step 206), and then reenters a sleep state. The limiter thread preferably sleeps for a time period that is equal to a regulated time period; for example, if ten messages may be sent in one second, then the limiter thread would sleep for one second. The limiter thread executes until it is killed by the application thread after the application thread has completed a phase in which it is attempting to transmit messages in a regulated fashion.

After an optional phase in which the application performs some type of initialization for the next round of message transmission (step 208), the application thread is also executing a loop in which it is attempting to transmit messages while the limiter thread is cycling. The application thread adjusts the message count variable for each message that is transmitted. In FIG. 2, the message count variable is incremented prior to transmitting a message (step 210); alternatively, the message count variable may be incremented after a message is transmitted.

However, before a message is transmitted, the application thread checks whether it is allowed to transmit another message by comparing the message count variable with a predetermined value that represents the maximum number of messages that may be sent within the predetermined regulated time period (step 212). If the comparison is favorable for transmitting another message, which in the example of FIG. 2 means that the number of transmitted messages is less than the maximum threshold, then the application thread transmits another message (step 214).

If the comparison is not favorable for transmitting another message, then the application thread waits to transmit another message by entering a sleep state (step 216). The application thread preferably sleeps for a time period that is substantially shorter than the regulated time period, i.e. a relatively short time period. For example, if the regulated time period is one second, then the application thread may sleep for one millisecond. When the application thread awakens, it repeats the comparison of the message count variable and the maximum value by looping back to step 212. Depending on the result of the comparison, the application thread again performs the appropriate action.

After transmitting a message at step 214, a determination is made as to whether or not the application thread should continue to transmit messages (step 218). For example, the application thread may have been tasked to transmit messages for a particular period of time, e.g. one hour, and the application thread could check a timer condition to determine whether it has exceeded the time period. As another example, the application thread may have been tasked to send a particular number of messages, and the application thread could check some type of counter condition to determine whether it has exceeded this number. Other conditions for limiting the operation of the application thread may be employed, and these conditions may be statically or dynamically determined or adjusted based on configuration parameters, operating conditions, user input, or other considerations.

If the application thread should continue to send messages, then it branches back to step 210 to send at least one more message. If the application thread should not continue to send messages, then the application thread kills the limiter thread that it previously spawned (step 220), and the process is complete.

As mentioned briefly above, the examples herein depict only a single application thread. However, it should also be understood that the application thread and the limiter thread should not be restricted to being interpreted as existing in the execution space of a single process or of a single application. For example, in the embodiment described above, an application thread spawns a limiter thread so that the application may use the limiter mechanism of the present invention. In an alternative embodiment, the limiter thread may be spawned by an application or process other than the application that is using the limiter mechanism of the present invention. In this alternative scenario, a separate process may control one or more limiter threads for the use of applications that need a limiter mechanism. In this alternative embodiment, the application that is using the limiter mechanism can discover or be provided with the address of its message count variable in shared memory by the application or process that is controlling the limiter thread, thereby implying that the controlling application communicates or coordinates with the using application in some manner. In this manner, the application thread and the limiter thread may exist in different process spaces, and the message count variable may be interpreted as existing in shared memory that is accessible system-wide and not merely within a single process space.

Figure 3:
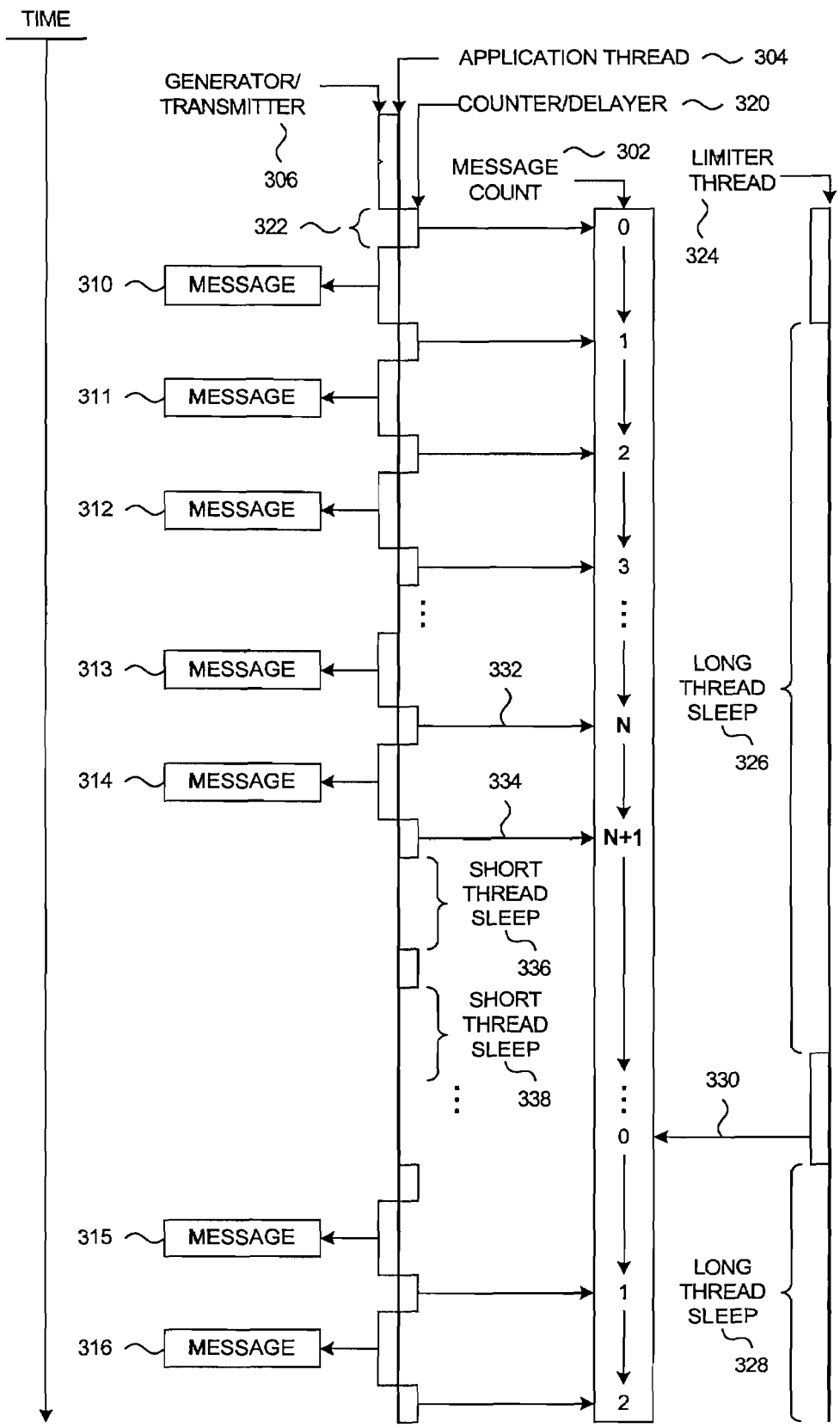
FIG. 3 is a set of timelines that depict the manner in which an application thread and a limiter thread interoperate through the message count variable in shared memory to establish a limiter mechanism in accordance with the present invention.

With reference now to FIG. 3, a set of timelines depict the manner in which an application thread and a limiter thread interoperate through the message count variable in shared memory to establish a limiter mechanism in accordance with the present invention. FIG. 3 depicts some of the results of the actions that were described above with respect to FIG. 2 by showing the application thread, the limiter thread, and the message count variable over a period of time; time increases from the top of FIG. 3 to the bottom of FIG. 3. It should be noted that the timelines are not shown to scale.

Message count 302 shows the values that the message count variable in shared memory may have over a period of time. In this example, the maximum number of messages that may be sent per time unit is "N", and the limiter mechanism increments the message count variable. Hence, the message count begins at zero and increases to "N+1", which is held for some period of time during which the transmission of messages ceases. After the transmission of messages resumes, then the incremental increase of the message count begins anew.

The execution of application thread 304 is separated into two sets of time periods in accordance with a specific implementation of the present invention. In this example, it is assumed that generator/transmitter 306 of the application is responsible for the generation and transmission of messages 310-316, whereas counter/delayer 320 is responsible for tracking the number of messages that have been transmitted while also delaying the further transmission of messages if the number of messages for the current time period would exceed the allowable threshold value. FIGS. 4-5 show Java language statements that may be used to implement the present invention in accordance with the generator/transmitter and counter/delayer configuration shown in FIG. 3.

During time period 322, generator/transmitter 306 calls a routine in counter/delayer 320 that initializes the message count variable in shared memory while also spawning limiter thread 324. In a fashion similar to that described with respect to FIG. 2, limiter thread 324 enters its loop of execution in which relatively long periods of thread sleep, such as thread sleep periods 326 and 328, are interrupted by short periods of execution in which the limiter thread resets the message count variable, such as write action 330. In this manner, the message count variable can be accurately reset at the end or beginning of every regulated time period.

Meanwhile, application thread 304 attempts to send messages without violating its specified rate of transmission. Prior to sending a message, the generator/transmitter checks with the counter/delay, which increments the message count variable, e.g., represented by write action 332. As long as the message count has not exceeded the maximum threshold "N" during the given time period that is being tracked by the limiter thread, then the counter/delayer does not insert any delays into the transmission process, and the generator/transmitter can generate and transmit another message, such as message 314.

However, after write action 334, the counter/delayer discovers that the message count has reached "N+1", i.e. that another message transmission would violate the specified threshold "N". Hence, the counter/delayer inserts a delay into the generation/transmission process by entering a relatively short thread sleep 336 that holds the operation of the generator/transmitter.

Upon awakening of the application thread, the counter/delayer again checks the message count variable, and because the limiter thread has not yet reset the message count variable, the counter/delayer again enters another thread sleep period, shown as thread sleep 338. The counter/delayer continues this cycle until the limiter thread has reset the message count with write action 330.

Write action 330 essentially indicates that the previous time period has ended and the application has entered a new time period to be considered as the current time period. Hence, upon awakening after write action 330, the counter/delayer finds that the message count is not greater than the maximum message count for the current time period, and the counter/delayer does not enter a thread sleep. The counter/delayer returns execution control to the generator/transmitter, which is then free to generate and transmit message 315. This cycling process may continue until the application thread determines that no further messages should be transmitted, as explained with respect to FIG. 2.

With reference now to FIG. 4, a set of Java language statements depicts an example of a Limiter class that may be used to implement a limiter mechanism in accordance with an embodiment of the present invention. Statement 402 declares the Limiter class; Limiter objects of this class are shown in use in FIG. 5, which is described in more detail further below. The statements shown in FIG. 4 merely illustrate some of the functionality that could be incorporated into a Limiter class, which may comprise additional attributes and methods other than those shown in FIG. 4.

Statement 404 declares a "limiterThread" attribute for referencing the child thread to be spawned by the application thread. Statement 406 declares a "maxMessagesPerTimeUnit" attribute that reflects the maximum number of messages that can be transmitted by the application in a given period of time, i.e. the maximum allowable rate. Statement 408 declares a "messagecounter" variable that stores the number of messages that have been sent by the application; the "static" keyword ensures that the message count variable is a class variable, i.e. there is only one copy of the variable associated with the class rather than many copies of the variable associated with each instance of the class.

Statement 410 defines a method for setting the maximum number of messages that can be transmitted by the application in a given period of time. Statement 412 defines a method to be called by the generator/transmitter portion of the code when it desires to spawn the limiter thread and start the limiter mechanism, whereas statement 414 defines a method to be called to kill the limiter thread and stop the limiter mechanism.

Statement 416 defines a "counterDelayer" method for counting and delaying message transmission. Statement 418 increments the message count variable, whereas statement 420 determines if the message counter exceeds the maximum threshold for the current time period. If the threshold has been exceeded, then statement 422 causes the thread to enter a one millisecond sleep period.

Statement 424 defines the "run( )" method for the Limiter class. Statement 402 declares that the Limiter class implements the "Runnable" interface. To create a thread, one can pass a "Runnable" object, i.e. an object that implements the "Runnable" interface by defining a "run( )" method, to the "Thread" constructor. A "run( )" method of a "Runnable" object is the "body" of the thread; it begins executing when the "start( )" method of the "Thread" object is called and continues to run until it returns or until the "stop( )" method of its "Thread" object is called. Statement 426 ensures that the "run( )" method enters an infinite "while" loop and does not return; hence, the method can only be halted by calling "stop( )" on the thread instance. Within this loop, statement 428 causes the "Thread" object to enter a one second (one thousand milliseconds) thread sleep; after exiting the thread sleep, statement 430 resets the message counter variable to zero.

With reference now to FIG. 5, a set of Java language statements depicts the use of a limiter mechanism in accordance with an embodiment of the present invention. FIG. 5 shows the use of a limiter mechanism as implemented in the Limiter class shown in FIG. 4.

An application that implements the present invention uses at least two threads of execution: an application thread and a limiter thread. As mentioned briefly with respect to FIG. 3, with respect to execution flow, the application thread can be considered to be divided into a message generator/transmitter and a counter/delayer. As shown in FIG. 4, most of the functionality with respect to the limiter mechanism of the present invention can be embodied into a single limiter class: the functionality for the counter/delayer; the functionality for spawning a limiter thread; and the functionality for the body of the limiter thread.

After an optional initialization phase or possibly a prior message transmission phase in the application, statement 502 instantiates a new Limiter object, and statement 504 calls its "start( )" method, which spawns the limiter thread. At this point, the application now has a distinct application thread and a distinct limiter thread, and the limiter thread is executing the its "run( )" method.

The application thread continues execution with statement 506, which sets the maximum number of messages that may be transmitted in a given time period.

The application thread then enters an execution loop that can be considered to be the generator/transmitter portion of the application thread. Statement 508 checks a "done" variable to determine whether the application should cease generating and transmitting messages; as explained with respect to FIG. 2, there may be many conditions that are placed on the application as to the manner in which message transmission is controlled in a greater sense. Within this execution loop, statement 510 calls the routine within the limiter object created by statement 502. The call to the "counterDelayer( )" method essentially notifies the method that another message needs to be transmitted, thereby allowing the "counterDelayer( )" method to increment the message count variable and to determine whether it should stall the transmission of messages by entering a series of short thread sleeps. When statement 512 is reached, the application has no restrictions on its message transmission ability, so the next message is generated and transmitted.

Statement 514 can be used to catch an exception that could be thrown by the "counterDelayer( )" routine; for example, the "counterDelayer( )" method could be alternatively written to throw an exception when the expiration of an additional, relatively long timer indicates a condition in which the application has stalled for too long while waiting for the limiter thread to reset the message count variable. Other potential error conditions may also be considered within the Limiter object.

At some point in time, the application thread will exit the execution loop controlled by statement 508, at which point the limiter thread is no longer needed. Statement 516 kills the limiter thread by calling the "stop( )" method of the limiter object.

The advantages of the present invention should be apparent in view of the detailed description of the invention that is provided above. The present invention allows the message traffic from a client to be regulated by controlling the rate of requests, i.e. the number of requests per time unit, that are issued by a client application. The number of requests per time unit is controlled by a limiter thread that is separate from the application thread that is generating the communication traffic. The two threads may spend a majority of their existence in a sleep state, thereby conserving execution time for other processes.

The regulator mechanism of the present invention can be implemented in scenarios for which there is a desire to limit communication traffic at the application level, whether between two applications or between two systems. In one example scenario, a Web-server-load-test application can be constructed by employing a plurality of Web browser simulators, each of which generate and send requests to a server, and the rate of requests from each simulator can be accurately controlled by the limiter of the present invention. By increasing the accuracy of the simulation of client communication traffic, the accuracy of the entire load-test simulation can be increased.

It is important to note that while the present invention has been described in the context of a fully functioning data processing system, those of ordinary skill in the art will appreciate that some of the processes associated with the present invention are capable of being distributed in the form of instructions in a computer readable medium and a variety of other forms, regardless of the particular type of signal bearing media actually used to carry out the distribution. Examples of computer readable media include media such as EPROM, ROM, tape, paper, floppy disc, hard disk drive, RAM, and CD-ROMs and transmission-type media, such as digital and analog communications links.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A computer program product in a computer recordable storage medium for use in regulating an amount of generated communication traffic using multiple execution threads or processes in a data processing system, the computer program product comprising:

instructions for starting a first thread or process and a second thread or process, wherein the first thread or process and the second thread or process access a message count variable in shared memory, wherein the message count variable represents a number of messages that are transmitted by the first thread or process within a first time unit;

instructions for sleeping the second thread or process for the first time unit;

instructions for resetting the message count variable by the second thread or process and re-sleeping the second thread or process for the first time unit in response to an awakening of the second thread or process;

instructions for comparing the message count variable with a predetermined count value on the first thread or process;

instructions for sleeping the first thread or process for a second time unit in response to a first comparative result;

instructions for repeating the comparison step on the first thread or process in response to an awakening of the first thread or process; and instructions for adjusting the message count variable and transmitting a message on the first thread or process in response to a second comparative result.

2. The computer program product of claim 1 further comprising:

instructions for stopping the second thread or process after the first thread or process has completed its transmission of messages.

3. The computer program product of claim 1 wherein the second time period is substantially shorter than the first time period.

4. The computer program product of claim 1 wherein the second thread or process resets the message count variable to zero and the first thread or process adjusts the message count variable by incrementing the message count variable.

5. The computer program product of claim 1 wherein the second thread or process resets the message count variable to a non-zero number and the first thread or process adjusts the message count variable by decrementing the message count variable.

* * * * *